US012420786B2

(12) United States Patent
Sugaya

(10) Patent No.: US 12,420,786 B2
(45) Date of Patent: Sep. 23, 2025

(54) RISK ESTIMATION SYSTEM AND VEHICLE CONTROL SYSTEM

(71) Applicant: TOYOTA JIDOSHA KABUSHIKI KAISHA, Toyota (JP)

(72) Inventor: Fumio Sugaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 18/516,041

(22) Filed: Nov. 21, 2023

(65) Prior Publication Data

US 2024/0246534 A1 Jul. 25, 2024

(30) Foreign Application Priority Data

Jan. 19, 2023 (JP) ................. 2023-006586

(51) Int. Cl.
*B60W 30/09* (2012.01)
*B60W 30/095* (2012.01)
*B60W 30/18* (2012.01)
*B60W 40/105* (2012.01)

(52) U.S. Cl.
CPC ........ *B60W 30/0956* (2013.01); *B60W 30/09* (2013.01); *B60W 30/18154* (2013.01); *B60W 40/105* (2013.01)

(58) Field of Classification Search
CPC ............ B60W 30/0956; B60W 30/09; B60W 30/18154; B60W 40/105; B60W 2554/20; B60W 2050/143; B60W 50/14; G08G 1/166
See application file for complete search history.

(56) References Cited

U.S. PATENT DOCUMENTS

| 9,405,727 B2 | 8/2016 | Nagata |
| 9,669,760 B2 | 6/2017 | Hanita et al. |
| 9,898,929 B2 | 2/2018 | Harada et al. |
| 11,175,673 B2 | 11/2021 | Eshima |
| 11,928,399 B1 * | 3/2024 | Dolan ..................... G06F 30/15 |
| 2014/0207307 A1 * | 7/2014 | Jonsson .......... B60W 30/18145 701/1 |

(Continued)

FOREIGN PATENT DOCUMENTS

| JP | 2021-89698 A | 6/2021 |
| JP | 2021089698 A * | 6/2021 |

*Primary Examiner* — Daniel M. Robert
(74) *Attorney, Agent, or Firm* — Sughrue Mion, PLLC

(57) ABSTRACT

A risk estimation system estimates the degree of risk ahead of a vehicle. Three-dimensional object layout information indicates the three-dimensional layout of a three-dimensional object ahead of the vehicle. An intersecting road is a road that intersects a traveling road, which is a road on which the vehicle is traveling, at an intersection ahead of the vehicle. The risk estimation system sets a first area that extends from the intersection into the intersecting road by a first length. Based on the three-dimensional object layout information, the risk estimation system calculates the degree of blocking indicating a degree to which the first area is blocked by the three-dimensional object when seen from the position of the vehicle. After that, the risk estimation system calculates the degree of risk in such a way that the degree of risk increases as the degree of blocking is higher.

4 Claims, 6 Drawing Sheets

(56) References Cited

U.S. PATENT DOCUMENTS

| | | | |
|---|---|---|---|
| 2014/0214271 A1* | 7/2014 | Choi | B60R 1/002 |
| | | | 701/36 |
| 2019/0384302 A1* | 12/2019 | Silva | B60W 60/00272 |
| 2020/0207341 A1 | 7/2020 | Inoue et al. | |
| 2020/0231158 A1* | 7/2020 | Okuyama | B60W 60/0054 |
| 2020/0241545 A1* | 7/2020 | Anthony | G05D 1/0088 |
| 2021/0061350 A1 | 3/2021 | Kinoshita et al. | |
| 2021/0284141 A1 | 9/2021 | Sugaya | |
| 2021/0284237 A1 | 9/2021 | Miyano et al. | |
| 2021/0291820 A1 | 9/2021 | Inoue et al. | |
| 2023/0062581 A1* | 3/2023 | Park | B60W 60/001 |
| 2024/0246534 A1* | 7/2024 | Sugaya | B60W 30/0956 |

* cited by examiner

FIG. 1
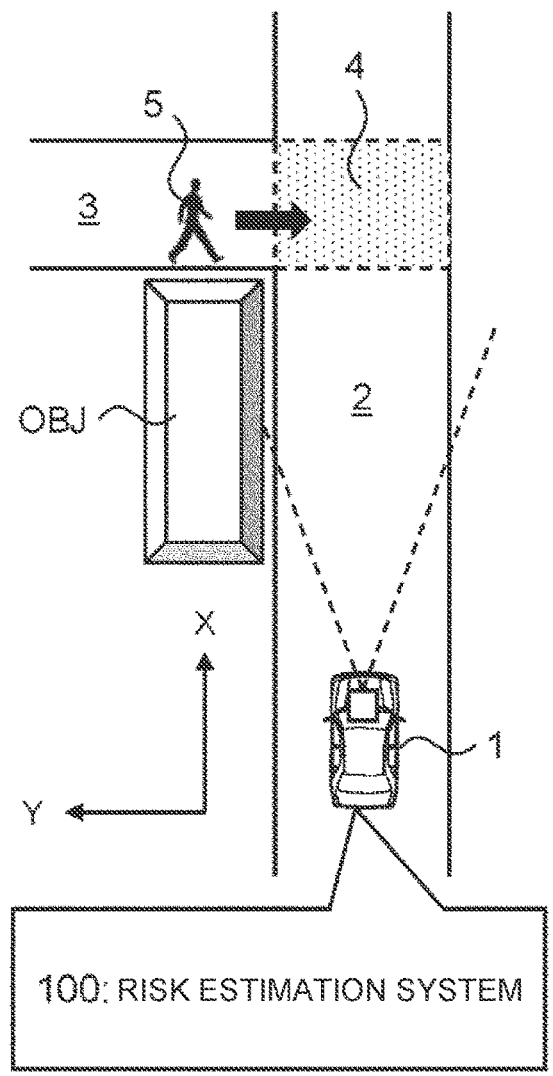
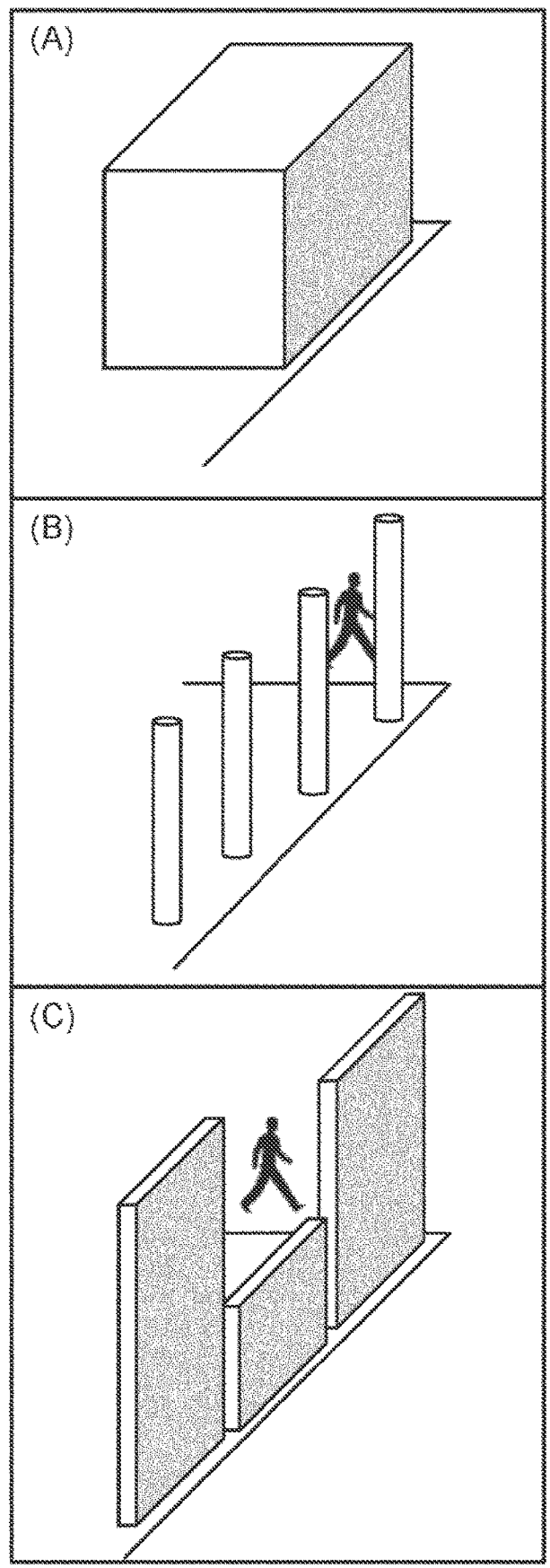

FIG. 3
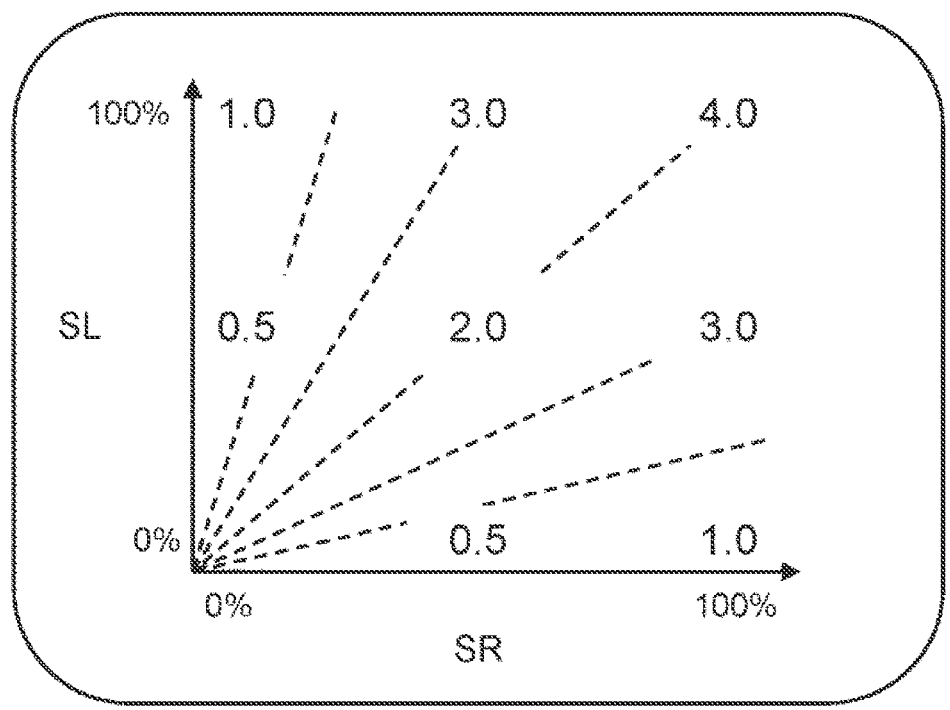
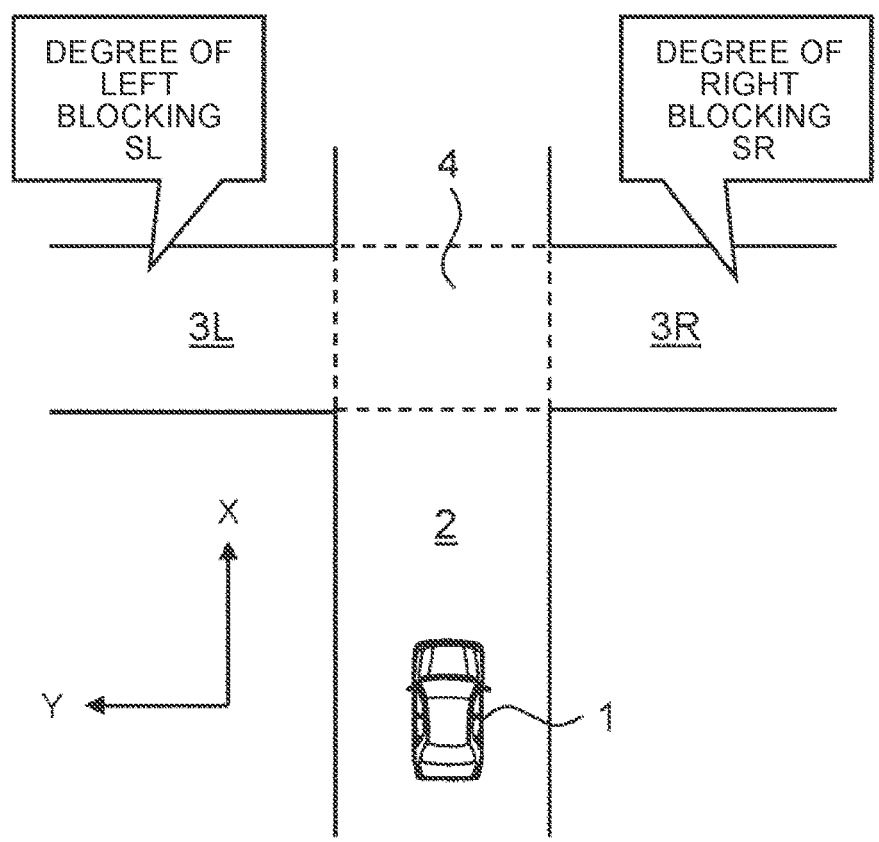

RISK ESTIMATION SYSTEM AND VEHICLE CONTROL SYSTEM

CROSS-REFERENCE TO RELATED APPLICATION

This application claims priority to Japanese Patent Application No. 2023-006586 filed on Jan. 19, 2023, incorporated herein by reference in its entirety.

BACKGROUND

1. Technical Field

The present disclosure relates to a technique for estimating the degree of risk ahead of a vehicle. The present disclosure relates also to a technique for controlling the vehicle based on the degree of risk.

2. Description of Related Art

Japanese Unexamined Patent Application Publication No. 2021-089698 (JP 2021-089698 A) discloses a technique for estimating the risk of an object coming from a blind spot. A blind spot is created by a view-blocking object ahead of a vehicle. The risk of an object coming from the blind spot is calculated in such a way that the risk increases as the "blind spot size angle", which indicates the size of the blind spot, is greater.

SUMMARY

Consider an intersecting road that intersects the road on which a vehicle is traveling. An object entering an intersection from the intersecting road can be a risk to the vehicle. In particular, when there is a view-blocking object in front of the intersecting road as seen from the vehicle, the visibility of the intersecting road is deteriorated with the result that it may become difficult to see an object on the intersecting road. However, it should be noted that view-blocking objects in the real environment have various structures. Some view-blocking objects are continuous while others are non-continuous. Some view-blocking objects are high while others are low. This means that the presence of a view-blocking object does not necessarily mean that the object on the intersecting road always becomes invisible.

The technology described in JP 2021-089698 A estimates the risk based on the blind spot size angle. However, the blind spot size angle alone does not sufficiently take into account the structure of a view-blocking object, nor does it take into account the visibility of the intersecting road. In other words, it is not possible to quantitatively evaluate whether or not the visibility of the intersecting road is poor based on the blind spot size angle alone. Therefore, the accuracy of risk estimation based on such a blind spot size angle is not necessarily high.

It is an object of the present disclosure to provide a technique that can accurately estimate the degree of risk ahead of a vehicle.

A first aspect relates to a risk estimation system that estimates the degree of risk ahead of a vehicle. The risk estimation system includes one or more processors and one or more storage devices configured to store three-dimensional object layout information indicating the three-dimensional layout of a three-dimensional object ahead of the vehicle. An intersecting road is a road that intersects the traveling road, on which the vehicle is traveling, at an intersection ahead of the vehicle. The one or more processors are configured to set a first area that extends from the intersection into the intersecting road by a first length. The one or more processors are configured to calculate the degree of blocking based on the three-dimensional object layout information. The degree of blocking indicates a degree to which the first area is blocked by the three-dimensional object when seen from the position of the vehicle. Then, the one or more processors are configured to calculate the degree of risk in such a way that the degree of risk increases as the degree of blocking is higher.

A second aspect relates to a vehicle control system that controls a vehicle. The vehicle control system includes the risk estimation system described above. The one or more processors are configured to perform risk avoidance control based on the degree of risk. The risk avoidance control is control in which at least one of steering and deceleration of the vehicle is performed to avoid a risk ahead of the vehicle.

According to the present disclosure, the three-dimensional layout of a three-dimensional object ahead of a vehicle is taken into account in estimating the degree of risk ahead of the vehicle. More specifically, the degree of blocking, which indicates a degree to which the first area in an intersecting road is blocked by the three-dimensional object, is calculated based on the three-dimensional layout of the three-dimensional object. Then, the degree of risk is calculated in such a way that the degree of risk increases as the degree of blocking is higher. By taking into account the three-dimensional layout of the three-dimensional object in this way, the present disclosure makes it possible to estimate the degree of risk ahead of the vehicle more accurately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a conceptual diagram showing an outline of a risk estimation system;

FIG. 3 is a conceptual diagram showing a modification;

DETAILED DESCRIPTION OF EMBODIMENTS

1. Risk Estimation System

Figure 2:
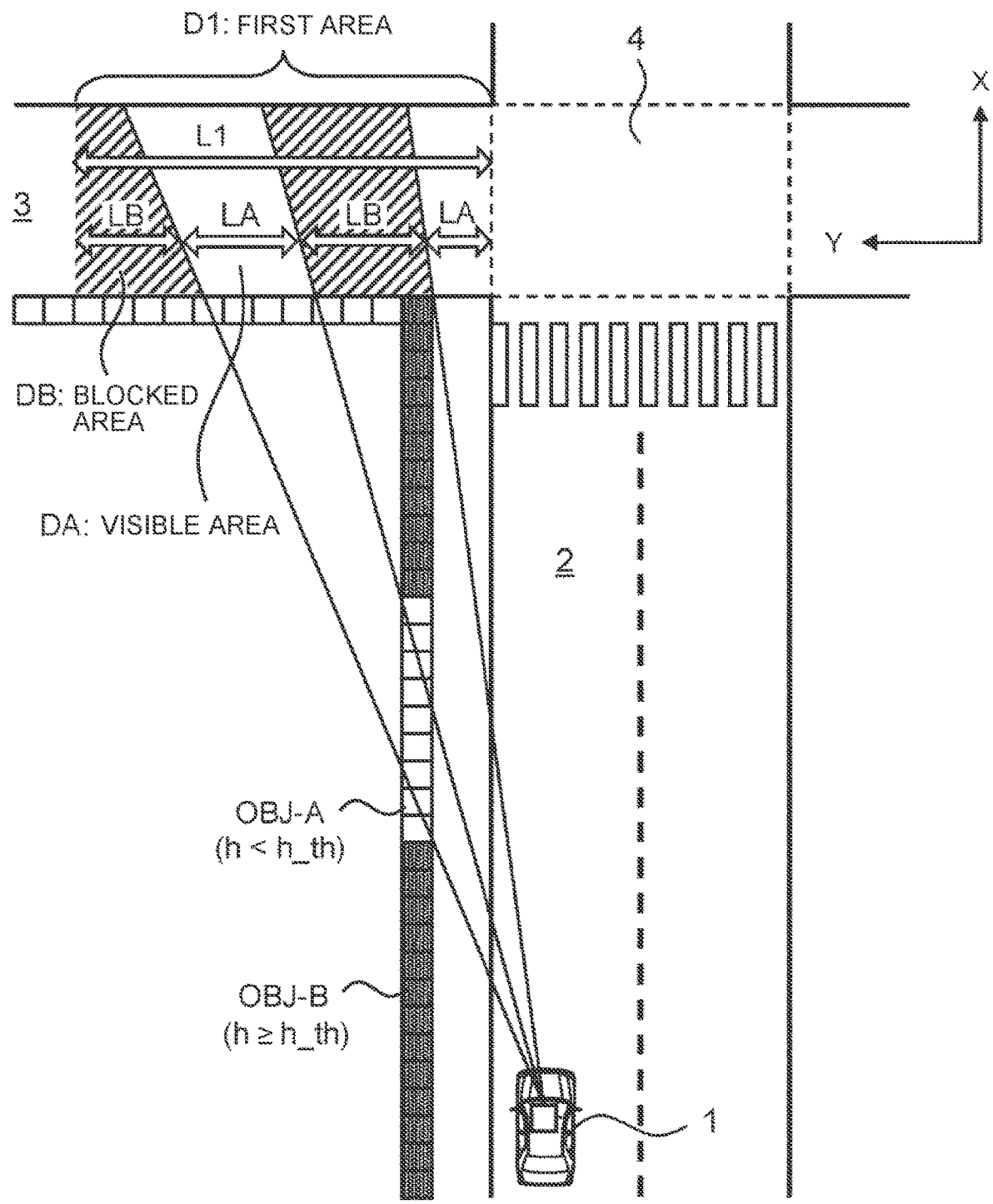
FIG. 2 is a conceptual diagram showing an example of risk estimation processing.

FIG. 1 is a conceptual diagram showing an outline of a risk estimation system 100 applied to a vehicle 1 according to an embodiment.

The vehicle 1 may be a vehicle driven by an operator or an autonomous driving vehicle on which an autonomous driving system is mounted. The operator may be a driver in the vehicle 1 or a remote operator remotely driving the vehicle 1. The vehicle 1 is traveling on a traveling road 2. An intersecting road 3 is a road that intersects the traveling road 2 at an intersection 4 ahead of the vehicle 1. The X direction is the direction in which the traveling road 2 extends, and the Y direction is the direction in which the intersecting road 3 extends. The X direction and the Y direction intersect.

A typical example of a risk ahead of the vehicle 1 is an object 5 present on the traveling road 2. Examples of the object 5 include pedestrians, bicycles, motorcycles, and other vehicles. The object 5 present on the traveling road 2 can be said to be an "apparent risk" for the vehicle 1. However, it should be noted that risks ahead of the vehicle 1 are not limited to such apparent risks but may include "potential risks" that may become apparent risks in the future. For example, the object 5 that may enter the traveling road 2 in the future is a "potential risk" for the vehicle 1.

The risk estimation system 100 not only recognizes an apparent risk ahead of the vehicle 1 but also predicts a potential risk ahead of the vehicle 1. In addition, the risk estimation system 100 estimates (calculates) the "degree of risk R" representing the magnitude of risk ahead of the vehicle 1. The degree of risk R obtained by the risk estimation system 100 is used, for example, for risk avoidance control of the vehicle 1 and risk notification to the operator of the vehicle 1.

In the following description, emphasis is placed on a potential risk ahead of the vehicle 1 and its degree of risk R. For dealing with an apparent risk, any method may be used. The method is not limited to a particular method.

As described above, the intersecting road 3 intersects the traveling road 2 at the intersection 4 ahead of the vehicle 1. The object 5 present on the intersecting road 3 is a potential risk for the vehicle 1 since it may enter the intersection 4. As shown in FIG. 1, a three-dimensional object (view-blocking object) OBJ is often located in front of the intersecting road 3 when seen from the vehicle 1. Examples of three-dimensional objects OBJ include buildings, walls, fences, guard-rails, signboards, utility poles, and other stationary objects. When the intersecting road 3 is blocked by such a three-dimensional object OBJ, the visibility of the intersecting road 3 is deteriorated with the result that the object 5 present on the intersecting road 3 may become difficult to see from the driver or the autonomous driving system. Therefore, basically, the degree of risk R when there is a three-dimensional object OBJ should be calculated higher than the degree of risk R when there is no three-dimensional object OBJ.

However, it should be noted that three-dimensional objects OBJ in the real environment have various structures. Some three-dimensional objects OBJ are continuous (see (A) in FIG. 1) while other three-dimensional objects OBJ are non-continuous (see (B) in FIG. 1). Some three-dimensional objects OBJ are high while other three-dimensional objects OBJ are low (see (C) in FIG. 1). A non-continuous three-dimensional object OBJ and a low three-dimensional object OBJ do not completely hide the intersecting road 3 from the driver or the autonomous driving system. In other words, a non-continuous three-dimensional object OBJ or a low three-dimensional object OBJ, if present, does not always lead to an extreme deterioration in the visibility of the intersecting road 3.

As described above, even if there is a three-dimensional object OBJ in front of the intersecting road 3 as seen from the vehicle 1, the object 5 on the intersecting road 3 is not necessarily invisible. This means that, if the degree of risk R is estimated based only on the presence or absence of a three-dimensional object OBJ, the estimation accuracy is not necessarily high. In view of the foregoing, this embodiment proposes a technique that can estimate the degree of risk R ahead of the vehicle 1 more accurately, with consideration for the structure (three-dimensional layout) of a three-dimensional object OBJ.

FIG. 2 is a conceptual diagram showing an example of risk estimation processing by the risk estimation system 100 according to the embodiment.

The risk estimation system 100 recognizes the intersection 4 and the intersecting road 3 ahead of the vehicle 1. In addition, in the intersecting road 3 ahead of the vehicle 1, the risk estimation system 100 sets a "first area D1" for estimating the degree of risk R. The first area D1 is an area where there may the object 5 that is going to enter the intersection 4 in the near future. More specifically, the first area D1 is set in such a way that the area extends from a point close to the intersection 4 into the intersecting road 3 (that is, in the Y direction) by a first length L1. For example, the first region D1 is set in such a way that the area extends from the end of the intersection 4 into the intersecting road 3 (that is, in the Y direction) by the first length L1. The width of the walking path may also be included in the first length L1.

The first length L1 is determined, for example, according to the following criteria. Assume that the object 5 on the intersecting road 3 can be recognized from the position of the vehicle 1 that is traveling before the intersection 4 and also assume that the vehicle 1 is stopped in two seconds by Advanced Emergency Braking System (AEBS) that starts almost at the same time the object 5 is recognized. In this case, the first length L1 is set to the distance that the object 5 is supposed to move during the two seconds. For example, when the object 5 (such as a pedestrian or a bicycle) is supposed to move at 4 m/s, the first length L1 is set to 8 m. If the first area D1 of the first length L1 is clearly visible without being blocked by a three-dimensional object OBJ, it can be said that the degree of risk R is low. In addition, the time required for the vehicle 1 to be stopped by AEBS depends also on the speed of the vehicle 1. Therefore, the risk estimation system 100 may set the first length L1 to be larger as the speed of the vehicle 1 is higher. In other words, the risk estimation system 100 may set the first length L1 to be smaller as the speed of the vehicle 1 is lower. Alternatively, the first length L1 may be set to a predetermined value.

The width of the first area D1 in the X direction may be determined freely. The width of the first area D1 in the X direction may be a predetermined width or the width of the intersecting road 3. In addition, the first area D1 may be a space having a predetermined height from the road surface of the intersecting road 3.

In addition, the risk estimation system 100 acquires the "three-dimensional object layout information" indicating the three-dimensional layout of a three-dimensional object OBJ ahead of the vehicle 1. The three-dimensional layout includes, for each three-dimensional object OBJ, the horizontal position in the XY plane and the height in the direction perpendicular to the XY plane. Typically, the horizontal position is expressed in the absolute coordinate system (latitude, longitude). The height may be a relative height seen from the vehicle 1, a height from the road surface, or an altitude in the absolute coordinate system.

The risk estimation system 100 calculates the "degree of blocking S" of the first area D1 based on the three-dimensional layout of the three-dimensional object OBJ indicated by the three-dimensional object layout information. The degree of blocking S indicates the degree of blocking of the first area D1 blocked by the three-dimensional object OBJ when seen from the reference position of the vehicle 1. The reference position of the vehicle 1 may be the installation position of the recognition sensor mounted on the vehicle 1, the position of the eyes of a standard driver, or a predetermined position on the vehicle 1. The reference position of the vehicle 1 in the absolute coordinate system is acquired based on the position of the vehicle 1 acquired by a device such as a GNSS sensor. The positions of the intersection 4 and intersecting road 3 in the absolute coordinate system are obtained from the map information. The risk estimation system 100 can calculate the degree of blocking S of the first area D1 based on the reference position of the vehicle 1, the map information, and the three-dimensional object layout information. It can also be said that the degree of blocking S is the reciprocal of the visibility of the first area D1 when seen from the reference position of the vehicle 1.

An example of a method for two-dimensionally calculating the degree of blocking S will be described with reference to FIG. 2. In this example, as the height of a three-dimensional object OBJ, the height from the road surface is used. The three-dimensional objects OBJ are classified into two types: a low three-dimensional object OBJ-A with the height lower than the predetermined height h_th and high three-dimensional objects OBJ-B with the height equal to or higher than the predetermined height h_th. For example, the predetermined height h_th is 0.8 m. It is assumed that, when seen from the reference position of the vehicle 1, the first area D1 is blocked by any one of the high three-dimensional objects OBJ-B but not by the low three-dimensional object OBJ-A. The risk estimation system 100 classifies the three-dimensional objects OBJ ahead of the vehicle 1 into the low three-dimensional object OBJ-A and the high three-dimensional objects OBJ-B based on the three-dimensional object layout information. Then, the risk estimation system 100 calculates the degree of blocking S based on the determination that the first area D1 is not blocked by the low three-dimensional object OBJ-A and that the first area D1 is blocked by any one of the high three-dimensional objects OBJ-B.

More specifically, the risk estimation system 100 sets virtual straight lines each connecting the reference position of the vehicle 1 and a determination point within the first area D1. When any one of the high three-dimensional objects OBJ-B is on a virtual straight line, it is determined that the determination point is blocked by the high three-dimensional object OBJ-B. On the other hand, when there is no high three-dimensional object OBJ-B on a virtual straight line, it is determined that the determination point is not blocked and is visible. A visible area DA is a set of determination points that are included in the first area D1 and are visible. On the other hand, a blocked area DB is a set of determination points that are included in the first area D1 and are blocked by any one of the high three-dimensional objects OBJ-B.

As shown in FIG. 2, only the virtual straight lines each connecting the reference position of the vehicle 1 and the end of one of the high three-dimensional objects OBJ-B may be considered. As shown in FIG. 2, an area sandwiched by such virtual straight lines is the visible area DA or the blocked area DB. The visible area DA and the blocked area DB appear alternately. By considering the virtual straight lines each connecting the reference position of the vehicle 1 and the end of one of the high three-dimensional objects OBJ-B, the first area D1 can be easily classified into the visible area DA and the blocked 30) area DB. This method is preferable from the viewpoint of reducing the computational load.

In this way, the risk estimation system 100 classifies the first area D1 into the visible area DA and the blocked area DB. Then, the risk estimation system 100 calculates the ratio of the total area of the blocked areas DB to the area of the first area D1 as the degree of blocking S. When the degree of blocking S is expressed as a percentage from 0% to 100%, the degree of blocking S can also be said as the "blocking ratio."

Alternatively, the length LA of each of the visible area DA and the length LB of each of the blocked areas DB along the Y direction may be considered. For example, a particular X-direction position belonging to the first area D1 is specified. At the particular X-direction position, the length LA of each of the visible areas DA and the length LB of each of the blocked areas DB along the Y-direction are acquired. The risk estimation system 100 calculates the ratio of the total of the lengths LB of the blocked areas DB to the first length L1 of the first area D1 as the degree of blocking S (blocking ratio). For example, when the first length L1 is 8.0 m and the total of the lengths LB of the blocked areas DB is 4.0 m, the degree of blocking S (blocking ratio) is 50%.

Note that the first area D1 may be a space having a predetermined height from the road surface of the intersecting road 3. In this case, too, an extended version of the above method can be applied. More specifically, the visible area DA is an area (space) that is not blocked by any of the three-dimensional objects OBJ, and the blocked area DB is an area (space) that is blocked by any of the three-dimensional objects OBJ. The risk estimation system 100 classifies the first area D1 into the visible areas DA and the blocked areas DB. Then, the risk estimation system 100 calculates the ratio of the total of the volumes of the blocked areas DB to the volume of the first area D1 as the degree of blocking S (blocking ratio)

After calculating the degree of blocking S, the risk estimation system 100 calculates the degree of risk R representing the magnitude of risk ahead of the vehicle 1. The degree of risk R includes the first degree of risk R1 representing the magnitude of "potential risk" with respect to the intersecting road 3 ahead of the vehicle 1. The first degree of risk R1 is expressed as a function of the degree of blocking S of the first area D1. More specifically, as the degree of blocking S of the first area D1 is higher, the visibility of the first area D1 becomes worse and, therefore, the first degree of risk R1 increases. Conversely, as the degree of blocking S of the first area D1 is lower, the visibility of the first area D1 becomes better and, therefore, the first degree of risk R1 decreases. The risk estimation system 100 calculates the first degree of risk R1 (that is, degree of risk R) in such a way that the first degree of risk R1 increases as the degree of blocking S of the first area D1 is higher.

As described above, the three-dimensional layout of a three-dimensional object OBJ ahead of the vehicle 1 is taken into account in estimating the degree of risk R ahead of the vehicle 1 in this embodiment. More specifically, the degree of blocking S, which indicates a degree to which the first area D1 in the intersecting road 3 is blocked by the three-dimensional object OBJ, is calculated based on the three-dimensional layout of the three-dimensional object OBJ. Then, the degree of risk R is calculated in such a way that the degree of risk R increases as the degree of blocking S is higher. By taking into account the three-dimensional layout of the three-dimensional object OBJ in this way, this embodiment makes it possible to estimate the degree of risk R ahead of the vehicle 1 more accurately.

In addition, the degree of blocking S of the first area D1 is quantitatively calculated according to this embodiment. Since a quantitative index called the degree of blocking S is calculated, the degree of risk R, which is based on the degree of blocking S, can also be quantitatively estimated. The quantitative degree of risk R has a physical meaning, not a sensory one. Such a quantitative degree of risk R is easy to use in risk avoidance control that will be described later.

In addition, the quantitative degree of blocking S can be geometrically calculated by a simple method according to this embodiment. This is preferable from the viewpoint of reducing the computational load.

Note that the degree of risk R may include another degree of risk that is based on a viewpoint different from that of the first degree of risk R1, that is, (R=R1+R2 . . . ). For example, the degree of risk R may include a second degree of risk R2 that depends on the environment of the intersection 4. For example, the second degree of risk R2 is lower when a traffic signal is installed at the intersection 4 than when no traffic signal is installed. As another example, the second degree of risk R2 may be lower as the width of the traveling road 2, on which the vehicle 1 is traveling, is greater.

FIG. 3 is a conceptual diagram showing a modification. In the modification, the case where the intersection 4 is a crossroads is considered. A left intersecting road 3L is the intersecting road 3 on the left side when seen from the vehicle 1. A right intersecting road 3R is the intersecting road 3 on the right side when seen from the vehicle 1. Ahead of the vehicle 1, the traveling road 2 intersects each of the left intersecting road 3L and the right intersecting road 3R. At the crossroads, the object 5 can easily move from one of the left intersecting road 3L and the right intersecting road 3R to the other. This means that the speed of the object 5 to move to the intersection 4 tends to be high. To reflect such a crossroads-specific tendency on the first degree of risk R1, the first degree of risk R1 may be calculated to be higher when the intersection 4 is a crossroads.

More specifically, the risk estimation system 100 calculates the degree of blocking S for each of the left intersecting road 3L and the right intersecting road 3R. The degree of left blocking SL is the degree of blocking S for the left intersecting road 3L. The degree of right blocking SR is the degree of blocking S for the right intersecting road 3R. When both the degree of left blocking SL and the degree of right blocking SR are nonzero, the risk estimation system 100 calculates the "total degree of blocking SA" in such a way that the total degree of blocking SA is higher than the simple sum of the degree of left blocking SL and the degree of right blocking SR. Then, the risk estimation system 100 calculates the first degree of risk R1 in such a way that the first degree of risk R1 increases as the total degree of blocking SA is higher. FIG. 3 also shows an example of the map of the first degree of risk R1 for a combination of the degree of left blocking SL and the degree of right blocking SR. According to the modification, the accuracy of the degree of risk R is further improved since the first degree of risk R1 is calculated in consideration of the crossroads-specific tendency.

2. Configuration Example of Risk Estimation System

Figure 4:
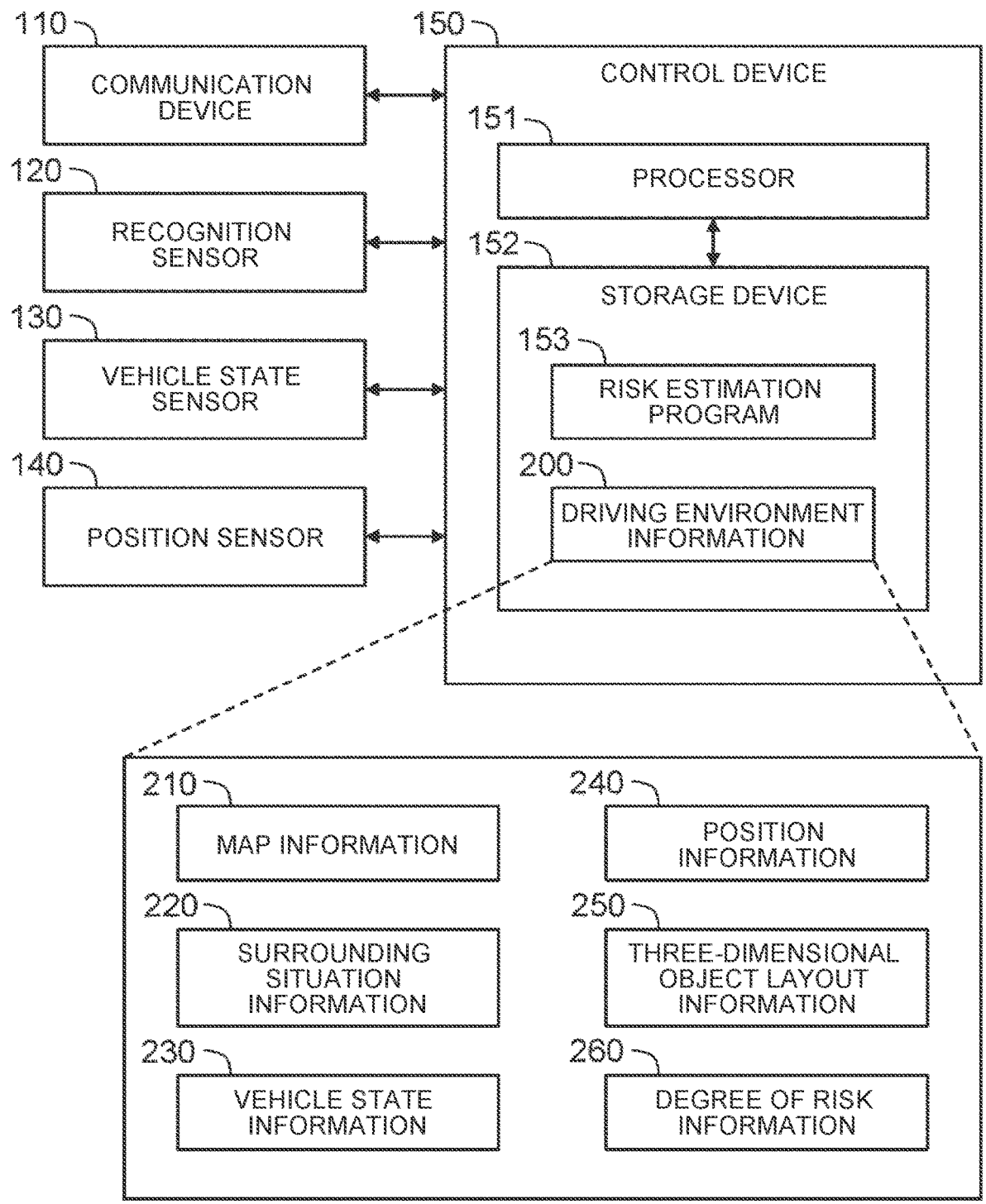
FIG. 4 is a block diagram showing a configuration example of the risk estimation system.

FIG. 4 is a block diagram showing a configuration example of the risk estimation system 100 according to the embodiment. Typically, the risk estimation system 100 is mounted on the vehicle 1. Alternatively, a part of the risk estimation system 100 may be provided in an external device outside the vehicle 1.

The risk estimation system 100 includes a communication device 110, a recognition sensor 120, a vehicle state sensor 130, a position sensor 140, and a control device 150. The recognition sensor 120 is mounted on the vehicle 1 to recognize (detect) the situation around the vehicle 1. Examples of the recognition sensor 120 include a camera, a laser imaging detection and ranging (LIDAR), and a radar.

The vehicle state sensor 130 detects the state of the vehicle 1. The vehicle state sensor 130 includes sensors such as a speed sensor, an acceleration sensor, a yaw rate sensor, and a steering angle sensor. The position sensor 140 detects the position and orientation of the vehicle 1. For example, the position sensor 140 includes Global Navigation Satellite System (GNSS).

The control device 150 is a computer that controls the risk estimation system 100. The control device 150 includes one or more processors 151 (hereinafter simply referred to as a processor 151) and one or more storage devices 152 (hereinafter simply referred to as a storage device 152). The processor 151 executes various types of processing. For example, the processor 151 includes a central processing unit (CPU). The storage device 152 stores various types of information necessary for processing by the processor 151. Examples of the storage device 152 include a volatile memory, a nonvolatile memory, a hard disk drive (HDD), and a solid-state drive (SSD).

A risk estimation program 153 is a computer program executed by the processor 151. The processor 151 executes the risk estimation program 153 to implement the functions of the control device 150. The risk estimation program 153 is stored in the storage device 152. Alternatively, the risk estimation program 153 may be recorded on a computer-readable recording medium.

The control device 150 acquires driving environment information 200 indicating the driving environment of the vehicle 1. The driving environment information 200 is stored in the storage device 152. The driving environment information 200 includes information such as map information 210, surrounding situation information 220, vehicle state information 230, position information 240, three-dimensional object layout information 250, and degree of risk information 260.

The map information 210 indicates information such as the road configuration and the lane layout. The map information 210 may be high-precision map information in which the three-dimensional layouts of three-dimensional objects OBJ are registered. Examples of three-dimensional objects OBJ include buildings, walls, fences, guardrails, signboards, utility poles, and other stationary objects. For example, the control device 150 communicates with the map management system via the communication device 110 to acquire the map information 210 from the map management system.

The surrounding situation information 220, which is the information indicating the surrounding situation of the vehicle 1, is obtained from the recognition result produced by the recognition sensor 120. For example, the surrounding situation information 220 includes images captured by the camera. Another example of the surrounding situation information 220 includes the point cloud information measured by the LIDAR. Furthermore, the surrounding situation information 220 includes object information on the objects around the vehicle 1. Examples of objects around the vehicle 1 include pedestrians, bicycles, other vehicles, three-dimensional objects OBJ, white lines, crosswalks, traffic lights, and signs. The object information indicates the relative position and relative speed of an object with respect to the vehicle 1. For example, based on the LIDAR point cloud data, an object can be identified and the relative position and relative speed of the object can be acquired. As another example, an object can be identified, and the relative position of the object can be calculated, by analyzing the images captured by the camera. The object information may include the moving direction and moving speed of an object.

The vehicle state information 230 indicates vehicle states detected by the vehicle state sensor 130. The vehicle states include states such as the speed, acceleration, yaw rate, and steering angle of the vehicle 1.

The position information 240 indicates the current position and orientation of the vehicle 1. The position information 240 is obtained by the position sensor 140. Localization processing using the map information 210 and the surrounding situation information 220 (object information) may be performed to produce the position information 240 that is highly accurate.

The three-dimensional object layout information 250 indicates the three-dimensional layout of a three-dimensional object OBJ ahead of the vehicle 1. The three-dimensional layout includes the horizontal position in the XY plane and the height in the direction orthogonal to the XY plane. Typically, the horizontal position is expressed in the absolute coordinate system (latitude, longitude). The height may be the relative height seen from the vehicle 1, the height from the road surface, or the altitude in the absolute coordinate system. For example, from the surrounding situation information 220 (object information), the control device 150 acquires the information on the relative position of a three-dimensional object OBJ with respect to the vehicle 1. The position of the vehicle 1 in the absolute coordinate system is obtained from the position information 240. The three-dimensional layout of a three-dimensional object OBJ in the absolute coordinate system can be acquired by combining the position of the vehicle 1 in the absolute coordinate system and the relative position of the three-dimensional object OBJ. As another example, when the map information 210 in which the three-dimensional layouts of three-dimensional objects OBJ are registered is available, the control device 150 may acquire the three-dimensional object layout information 250 from the map information 210. When the horizontal plane ahead of the vehicle 1 is divided into grids of a predetermined size (for example, 0.2 m square), the three-dimensional object layout information 250 may indicate, for each grid, the information on the presence or absence of a three-dimensional object OBJ and its height. When the space ahead of the vehicle 1 is divided into voxels of a predetermined size (for example, 0.2 m cube), the three-dimensional object layout information 250 may indicate the presence or absence of a three-dimensional object OBJ for each voxel.

The degree of risk information 260 indicates the degree of risk R representing the magnitude of risk ahead of the vehicle 1. The control device 150 performs the risk estimation processing, described in Section 1 above, to estimate (calculate) the degree of risk R.

Figure 5:
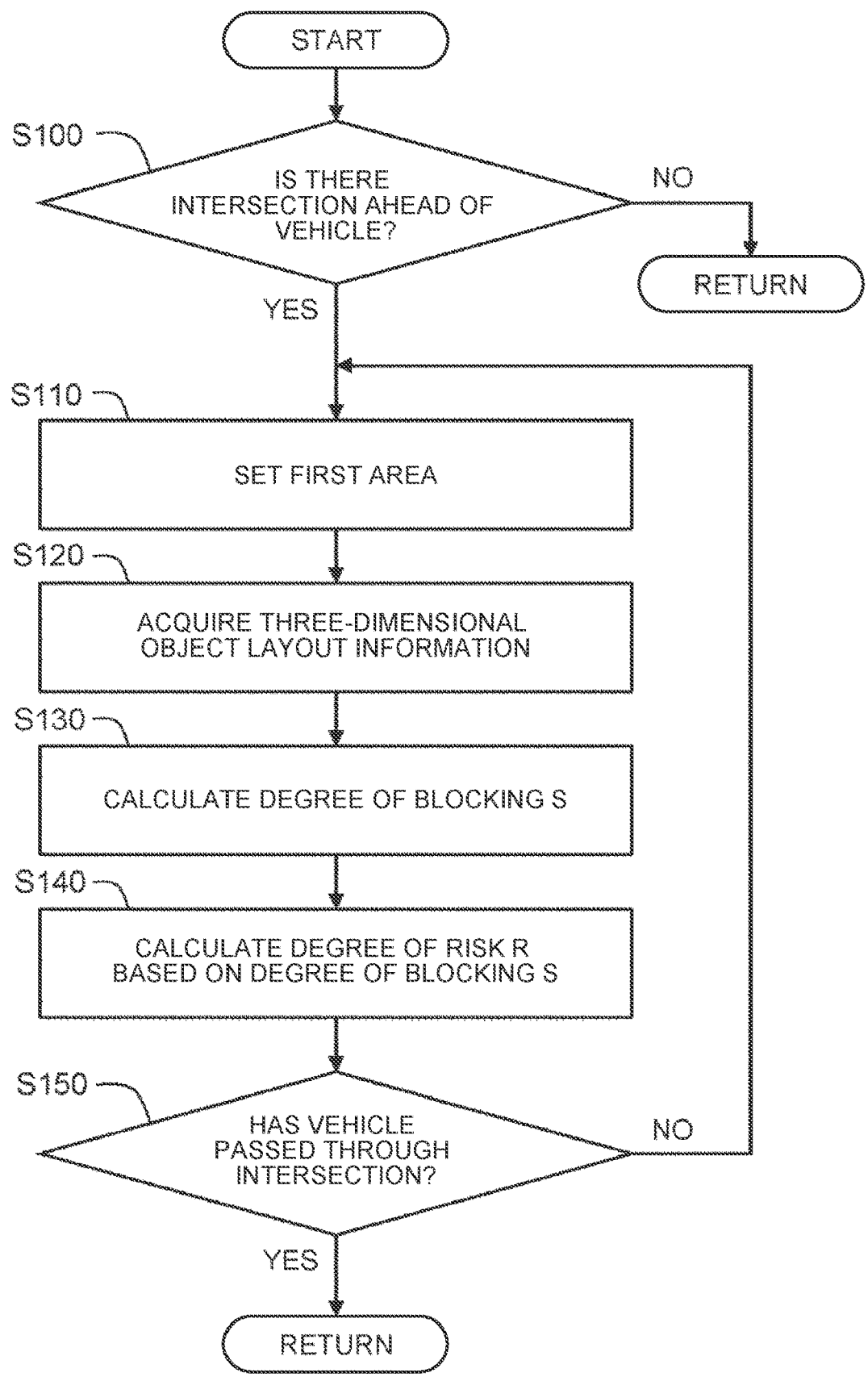
FIG. 5 is a flowchart showing the risk estimation processing.

FIG. 5 is a summarized flowchart showing the risk estimation processing.

In step S100, the control device 150 determines whether there is the intersection 4 within a predetermined distance ahead of the vehicle 1. The positions of the intersecting road 3 and the intersection 4 in the absolute coordinate system are obtained from the map information 210. The position of the vehicle 1 in the absolute coordinate system is obtained from the position information 240. The control device 150 determines whether there is the intersection 4 ahead of the vehicle 1 based on the map information 210 and the position information 240. Alternatively, the control device 150 may determine whether there is the intersection 4 ahead of the vehicle 1 based on the surrounding situation information 220 (object information). When there is the intersection 4 within a predetermined distance ahead of the vehicle 1 (step S100: Yes), the processing proceeds to step S110. Otherwise (step S100: No), the processing returns to step S100.

In step S110, the control device 150 sets the first area D1 (see FIG. 2) in the intersecting road 3 ahead of the vehicle 1. The first area D1 is set in such a way that the first area D1 extends from a point close to the intersection 4 into the intersecting road 3 (that is, in the Y direction) by the first length L1. For example, the first region D1 is set in such a way that the area extends from the end of the intersection 4 into the intersecting road 3 (that is, in the Y direction) by the first length L1. The control device 150 may set the first length L1 larger as the speed of the vehicle 1 increases. The speed of the vehicle 1 is obtained from the vehicle state information 230.

In step S120, the control device 150 acquires the three-dimensional object layout information 250 as described above.

In step S130, the control device 150 calculates the degree of blocking S of the first area D1. The degree of blocking S indicates the degree of blocking of the first area DI by the three-dimensional object OBJ when seen from the reference position of the vehicle 1. The reference position of the vehicle 1 may be the installation position of the recognition sensor 120 mounted on the vehicle 1, the eye position of a standard driver, or a predetermined position on the vehicle 1. The reference position of the vehicle 1 in the absolute coordinate system is acquired based on the position information 240. The positions of the intersection 4 and the intersecting road 3 in the absolute coordinate system are obtained from the map information 210. The control device 150 calculates the degree of blocking S of the first area DI based on the reference position of the vehicle 1, the map information 210, and the three-dimensional object layout information 250.

In step S140, the control device 150 calculates the degree of risk R representing the magnitude of risk ahead of the vehicle 1. The degree of risk R includes the first degree of risk R1 representing the magnitude of "potential risk" with respect to the intersecting road 3 ahead of the vehicle 1. The first degree of risk R1 is expressed as a function of the degree of blocking S of the first area D1. The control device 150 calculates the first degree of risk R1 (that is, the degree of risk R) in such a way that the first degree of risk R1 increases as the degree of blocking S of the first area D1 is higher.

Steps S110 to S140 are repeated until the vehicle 1 has passed through the intersection. When the first length L1 depends on the speed of the vehicle 1, the first area DI also varies according to a change in the speed of the vehicle 1. When the vehicle 1 has passed through the intersection (step S150: Yes), the processing returns to step S100.

3. Vehicle Control System

The degree of risk R ahead of the vehicle 1 may be used for controlling the vehicle 1. A vehicle control system 100X that controls the vehicle 1 will be described below. It should be noted that the vehicle control system 100X includes the risk estimation system 100 described above.

Figure 6:
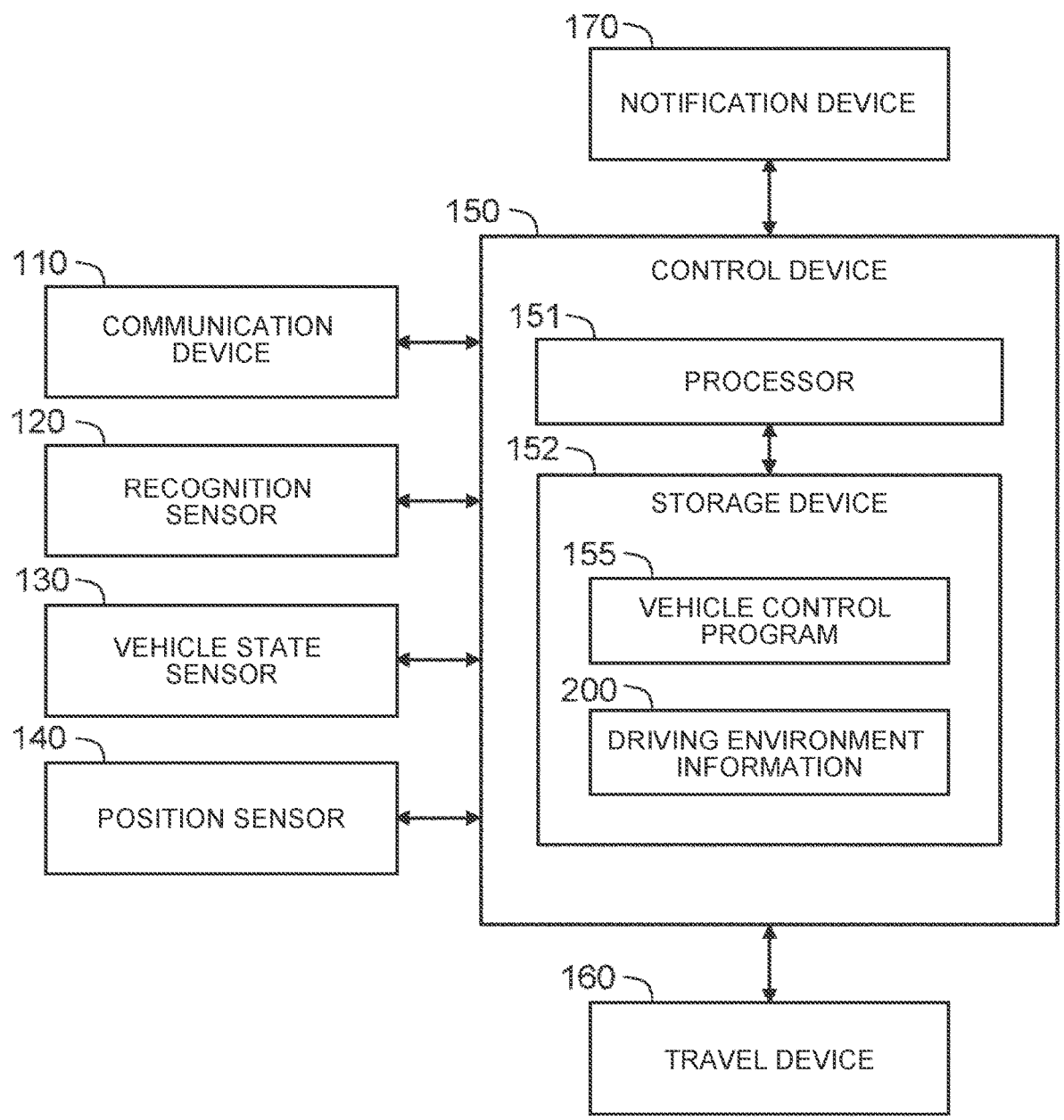
FIG. 6 is a block diagram showing a configuration example of a vehicle control system.

FIG. 6 is a block diagram showing a configuration example of the vehicle control system 100X according to the embodiment. In addition to the configuration shown in FIG. 4, the vehicle control system 100X further includes a travel device 160 and a notification device 170.

The travel device 160 includes a steering device, a drive device, and a braking device. The steering device steers the wheels. For example, the steering device includes an electric power steering (EPS) device. The drive device is a power source that generates driving force. Examples of the drive device include an engine, an electric motor, and an in-wheel motor. The braking device generates braking force. The control device 150 controls the travel device 160 (steering device, drive device, and braking device) to perform vehicle travel control (steering control, drive control, and braking control).

The control device 150 may perform autonomous driving control based on the driving environment information 200. More specifically, the control device 150 generates a travel plan for the vehicle 1 based on the driving environment information 200. In addition, the control device 150 generates a target trajectory, required for the vehicle 1 to travel according to the travel plan, based on the driving environment information 200. The target trajectory includes a target position and a target speed. After that, the control device 150 performs vehicle travel control so that the vehicle 1 follows the target trajectory.

The control device 150 may perform "risk avoidance control" to avoid a risk ahead of the vehicle 1 in advance. Typically, a risk for the vehicle 1 is the object 5 ahead of the vehicle 1 (see FIG. 1). The risk avoidance control includes at least one of steering control and deceleration control. For example, the control device 150 steers the vehicle 1 in a direction away from an apparent risk or a potential risk ahead of the vehicle 1. As another example, the control device 150 decelerates the vehicle 1 before an apparent risk or a potential risk that is ahead of the vehicle 1.

The degree of risk R is used for the risk avoidance control described above. For example, when the degree of risk R exceeds the activation threshold value, the control device 150 activates the risk avoidance control. As another example, as the degree of risk R is higher, the control device 150 may increase the steering amount or the deceleration rate to be used in the risk avoidance control. According to the embodiment, since the degree of risk R is estimated accurately, the accuracy of risk avoidance control, which is based on the degree of risk R, is also improved. For example, an unnecessary activation of the risk avoidance control is reduced.

The notification device 170 notifies the operator of the vehicle 1 about various information. For example, the notification device 170 includes a display device. Examples of the display device include a display and a head-up display (HUD). The notification device 170 may include a speaker. The control device 150 can notify the operator of the vehicle 1 about various types of information via the notification device 170.

The control device 150 may perform "risk notification processing" to notify the operator about the presence of a risk ahead of the vehicle 1. The degree of risk R is used for this risk notification processing. For example, when the degree of risk R exceeds the activation threshold value, the control device 150 performs the risk notification processing. As another example, the control device 150 may increase the risk notification strength as the degree of risk R is higher. The risk notification strength is, for example, the display size and the sound volume. According to this embodiment, since the degree of risk R is estimated accurately, the accuracy of risk notification processing, which is based on the degree of risk R, is also improved. For example, an unnecessary activation of the risk notification control is reduced.

What is claimed is:

1. A risk estimation system that estimates a degree of risk ahead of a vehicle, the risk estimation system comprising:
   one or more processors; and
   one or more storage devices configured to store three-dimensional object layout information, the three-dimensional object layout information indicating a three-dimensional layout of a three-dimensional object ahead of the vehicle, wherein:
   an intersecting road is a road that intersects a traveling road at an intersection ahead of the vehicle, the traveling road being a road on which the vehicle is traveling; and
   the one or more processors are configured
   to set a first area that extends from the intersection into the intersecting road by a first length,
   to calculate a degree of blocking based on the three-dimensional object layout information, the degree of blocking indicating a degree to which the first area is blocked by the three-dimensional object when seen from a position of the vehicle, and
   to calculate the degree of risk in such a way that the degree of risk increases as the degree of blocking is higher, wherein:
   the traveling road intersects a left intersecting road and a right intersecting road at the intersection;
   the left intersecting road is the intersecting road on a left side as seen from the vehicle;
   the right intersecting road is the intersecting road on a right side as seen from the vehicle;
   a degree of left blocking is the degree of blocking for the left intersecting road;
   a degree of right blocking is the degree of blocking for the right intersecting road; and
   the one or more processors are configured
   to calculate a total degree of blocking in such a way that the total degree of blocking is higher than a sum of the degree of left blocking and the degree of right blocking when both the degree of left blocking and the degree of right blocking are nonzero, and
   to calculate the degree of risk in such a way that the degree of risk increases as the total degree of blocking is higher.

2. The risk estimation system according to claim 1, wherein the one or more processors are configured to calculate the degree of blocking based on a determination that the first area is not blocked by the three-dimensional object lower than a predetermined height and that the first area is blocked by the three-dimensional object equal to or higher than the predetermined height.

3. The risk estimation system according to claim 1, wherein the one or more processors are configured to set the first length larger as a speed of the vehicle is higher.

4. A vehicle control system that controls a vehicle comprising:
   a risk estimation system that estimates a degree of risk ahead of a vehicle, the risk estimation system comprising:
   one or more processors; and
   one or more storage devices configured to store three-dimensional object layout information, the three-dimensional object layout information indicating a three-dimensional layout of a three-dimensional object ahead of the vehicle, wherein:
   an intersecting road is a road that intersects a traveling road at an intersection ahead of the vehicle, the traveling road being a road on which the vehicle is traveling; and
   the one or more processors are configured
   to set a first area that extends from the intersection into the intersecting road by a first length, to calculate a degree of blocking based on the three-dimensional object layout information, the degree of blocking indicating a degree to which the first area is blocked by the three-dimensional object when seen from a position of the vehicle, and to calculate the degree of risk in such a way that the degree of risk increases as the degree of blocking is higher;

the one or more processors are configured to perform risk avoidance control based on the degree of risk, the risk avoidance control being control in which at least one of steering and deceleration of the vehicle is performed to avoid a risk ahead of the vehicle, and wherein the traveling road intersects a left intersecting road and a right intersecting road at the intersection;

the left intersecting road is the intersecting road on a left side as seen from the vehicle;

the right intersecting road is the intersecting road on a right side as seen from the vehicle;

a degree of left blocking is the degree of blocking for the left intersecting road;

a degree of right blocking is the degree of blocking for the right intersecting road; and the one or more processors are configured to calculate a total degree of blocking in such a way that the total degree of blocking is higher than a sum of the degree of left blocking and the degree of right blocking when both the degree of left blocking and the degree of right blocking are nonzero, and to calculate the degree of risk in such a way that the degree of risk increases as the total degree of blocking is higher.

\* \* \* \* \*